(12) United States Patent
Tiry

(10) Patent No.: US 12,071,014 B2
(45) Date of Patent: Aug. 27, 2024

(54) REMOTE LOCATED CLUTCH

(71) Applicant: Arctic Cat Inc., Thief River Falls, MN (US)

(72) Inventor: Michael J. Tiry, Madison, WI (US)

(73) Assignee: Arctic Cat Inc., Thief River Falls, MN (US)

( * ) Notice: Subject to any disclaimer, the term of this patent is extended or adjusted under 35 U.S.C. 154(b) by 67 days.

(21) Appl. No.: 17/958,925

(22) Filed: Oct. 3, 2022

(65) Prior Publication Data

US 2023/0026010 A1 Jan. 26, 2023

Related U.S. Application Data

(63) Continuation of application No. 17/090,871, filed on Nov. 5, 2020, now Pat. No. 11,458,827, which is a (Continued)

(51) Int. Cl.
*B60K 5/04* (2006.01)
*B60K 17/02* (2006.01)
(Continued)

(52) U.S. Cl.
CPC ............... *B60K 5/04* (2013.01); *B60K 17/02* (2013.01); *B60K 17/08* (2013.01); *B60K 17/22* (2013.01); *B60K 17/28* (2013.01); *B60K 17/344* (2013.01); *B62K 5/01* (2013.01); *B60Y 2200/124* (2013.01); *B60Y 2400/72* (2013.01); *Y10T 29/49826* (2015.01)

(58) Field of Classification Search
CPC .... B60K 5/04; B60K 2005/003; B60K 17/02; B60K 17/04; B60K 17/08; B60K 17/28; B62K 5/01
See application file for complete search history.

(56) References Cited

U.S. PATENT DOCUMENTS

| 3,580,350 A | 5/1971 | Arkus-Duntov |
| 4,193,322 A | 3/1980 | Morino et al. |
(Continued)

FOREIGN PATENT DOCUMENTS

| EP | 0897074 A2 | 2/1999 |
| EP | 1355089 A2 | 10/2003 |
| JP | 2009-090931 A | 4/2009 |

OTHER PUBLICATIONS

Manoj et al., "Wet Clutch Modeling Techniques; Design Optimization of Clutches in an Automatic Transmission", Master's Thesis in the Automotive Engineering, Published 2013, 56 Pages, Sweden.

(Continued)

*Primary Examiner* — Frank B Vanaman
(74) *Attorney, Agent, or Firm* — Lowe Graham Jones PLLC

(57) ABSTRACT

A drive package includes a remote located CVT and a motor where the CVT is positioned rearward (or forward) of the motor. An auxiliary drive mechanism couples a drive shaft of the CVT to a crankshaft of the motor. The auxiliary drive mechanism is a belt or chain. The drive shaft is substantially parallel to, and longitudinally offset from, the crankshaft. Thus, the width of the drive package is reduced as compared to ATVs having a CVT located adjacent the motor.

15 Claims, 3 Drawing Sheets

Related U.S. Application Data continuation of application No. 16/711,092, filed on Dec. 11, 2019, now Pat. No. 10,836,243, which is a continuation of application No. 15/420,925, filed on Jan. 31, 2017, now Pat. No. 10,532,645, which is a continuation of application No. 14/245,901, filed on Apr. 4, 2014, now Pat. No. 9,592,725.

(51) Int. Cl.
  *B60K 17/08* (2006.01)
  *B60K 17/22* (2006.01)
  *B60K 17/28* (2006.01)
  *B60K 17/344* (2006.01)
  *B62K 5/01* (2013.01)

(56) References Cited

U.S. PATENT DOCUMENTS

| | | | |
|---|---|---|---|
| 4,714,126 A | 12/1987 | Shinozaki et al. | |
| 4,938,098 A | 7/1990 | Sasaki et al. | |
| 5,152,361 A | 10/1992 | Hasegawa et al. | |
| 5,406,154 A | 4/1995 | Kawaguchi et al. | |
| 5,915,495 A | 6/1999 | Kerlin et al. | |
| 6,076,624 A | 6/2000 | Izumi et al. | |
| 6,149,540 A | 11/2000 | Johnson et al. | |
| 6,270,106 B1 * | 8/2001 | Maki | B62K 5/01 180/21 |
| 6,405,823 B1 | 6/2002 | Fukamachi et al. | |
| 6,427,796 B1 | 8/2002 | Tsutsumikoshi | |
| 6,523,634 B1 | 2/2003 | Gagnon et al. | |
| 6,758,299 B2 | 7/2004 | Ito | |
| 6,799,781 B2 | 10/2004 | Rasidescu et al. | |
| 7,398,753 B2 | 7/2008 | Masuda et al. | |
| 7,549,676 B2 | 6/2009 | Uchiyama | |
| 7,610,987 B2 | 11/2009 | Aoyama | |
| 7,882,917 B2 | 2/2011 | Inomori et al. | |
| 8,002,653 B2 | 8/2011 | Shiozaki et al. | |
| 8,167,108 B2 | 5/2012 | Nogi | |
| 8,235,160 B2 | 8/2012 | Ogasawara et al. | |
| 8,245,810 B2 | 8/2012 | Huang et al. | |
| 8,596,405 B2 | 12/2013 | Sunsdahl et al. | |
| 9,944,177 B2 | 4/2018 | Fischer et al. | |
| 10,493,846 B2 | 12/2019 | Bannett et al. | |
| 2001/0047901 A1 | 12/2001 | Tsutsumikoshi | |
| 2002/0033295 A1 | 3/2002 | Korenjak et al. | |
| 2002/0152838 A1 * | 10/2002 | Miguchi | F16D 43/218 74/745 |
| 2003/0010561 A1 | 1/2003 | Bartel | |
| 2004/0124029 A1 | 7/2004 | Takenaka et al. | |
| 2005/0103558 A1 * | 5/2005 | Davis | B60K 17/08 180/383 |
| 2005/0126842 A1 | 6/2005 | Rasidesdu et al. | |
| 2005/0173177 A1 | 8/2005 | Smith et al. | |
| 2005/0173180 A1 | 8/2005 | Hypes et al. | |
| 2008/0161142 A1 | 7/2008 | Shiozaki et al. | |
| 2008/0268992 A1 | 10/2008 | Mitsubori et al. | |
| 2008/0283326 A1 | 11/2008 | Bennett et al. | |
| 2009/0183938 A1 | 7/2009 | Cover et al. | |
| 2010/0275713 A1 | 11/2010 | Penttila et al. | |
| 2012/0035018 A1 | 2/2012 | Choi | |
| 2012/0055728 A1 | 3/2012 | Bessho et al. | |
| 2013/0319784 A1 | 12/2013 | Kennedy et al. | |

OTHER PUBLICATIONS

First Office Action dated Jul. 5, 2021 for co-pending Canadian Patent Application No. 2,887,275; 8 pages.

Second Office Action dated Oct. 4, 2021 for co-pending Canadian Patent Application No. 2,887,275; 3 pages.

* cited by examiner

REMOTE LOCATED CLUTCH

PRIORITY CLAIM

The present application is a continuation of U.S. patent application Ser. No. 17/090,871, entitled REMOTE LOCATED CLUTCH, filed Nov. 5, 2020, which is a continuation of U.S. patent application Ser. No. 16/711,092, entitled REMOTE LOCATED CLUTCH, filed Dec. 11, 2019, and issued as U.S. Pat. No. 10,836,243 on Nov. 17, 2020, which is a continuation of U.S. patent application Ser. No. 15/420,925, entitled REMOTE LOCATED CLUTCH, filed Jan. 31, 2017, and issued as U.S. Pat. No. 10,532,645 on Jan. 14, 2020 which is a continuation of U.S. patent application Ser. No. 14/245,901, entitled REMOTE LOCATED CLUTCH, filed Apr. 4, 2014, and issued as U.S. Pat. No. 9,592,725 on Mar. 14, 2017 the content of which is hereby incorporated by reference.

FIELD OF INVENTION

The present invention relates to a drive package for vehicles, and more particularly, to a drive package with a remote located continuously variable transmission (CVT) for an all-terrain vehicle.

BACKGROUND

Vehicles, particularly straddle-type all-terrain vehicles (ATVs), have limited area to house the drive components of the vehicle, such as a motor and a transmission. Presently, most all-terrain vehicles have a CVT with a drive clutch positioned laterally of the motor. The crankshaft of the motor extends to or is coupled to the drive clutch of the CVT, such that the drive clutch is laterally adjacent (typically to the left or right) of the motor. This configuration consumes a certain width below an operator riding area, such as the foot-wells (or seat) of the vehicle, because the motor and the CVT are positioned primarily below the riding area upon which a rider sits. The result is that the foot-wells of the vehicle are spaced apart by the certain distance dictated by of the drive clutch of the CVT being adjacent the motor. It is advantageous to reduce the width of the drive package, in part, because the distance between the foot-wells, and the resulting vehicle width, are important design factors considering the various sizes of riders, ergonomic factors, and the width regulations that apply to certain all-terrain vehicles.

SUMMARY

The present invention overcomes the disadvantages of the prior-art drive systems by providing an all-terrain vehicle with a remote-located CVT positioned rearward (or forward) of a motor. An auxiliary drive mechanism (e.g., a belt) couples the CVT to the motor. As such, the drive package width is reduced, and therefore, the foot-wells of the vehicle are closer together as compared to a comparable ATV with a drive clutch driven directly by the crankshaft.

In a preferred embodiment, an ATV includes a front pair of ground engaging members (e.g., wheels) and a rear pair of ground engaging members (at least one pair for moving the vehicle). Naturally, the ATV includes a motor having a crankshaft for transferring rotational power to a transmission for rotation of the ground engaging members. Here, the vehicle includes a CVT with a drive clutch shaft rotatably coupled to the crankshaft and positioned either rearward or forward of the crankshaft. In either configuration, the drive clutch shaft is preferably substantially parallel to, and longitudinally and/or vertically offset from, the crankshaft. In the preferred embodiment, the drive clutch shaft is positioned rearward the crankshaft (FIGS. 1 and 2). An auxiliary drive mechanism rotatably couples the drive clutch shaft to the crankshaft. The auxiliary drive mechanism may be one of a belt, chain, or shaft, but preferably a belt. Because the auxiliary drive mechanism can be a relatively thin belt, for example, the drive package width is reduced because the CVT is positioned rearward the motor (FIG. 2), as opposed to on one side of the motor as with many existing ATVs.

As with many CVTs, the drive clutch is attached to a driven clutch by a CVT belt. The driven clutch is coupled to an output member and a gearbox system for rotating one or both of the front pair and the rear pair of ground engaging members. Typically, the gearbox system would be a transaxle for rotation of a rear axle coupled to the rear pair of ground engaging members (FIG. 2).

In some embodiments, the ATV includes a secondary drive mechanism rotatably coupled to one of the crankshaft and the drive clutch shaft for providing motive power to at least one auxiliary device attachable to the ATV. In some embodiments, a stator is secured to the side of the motor at the end of the crankshaft on an opposing side of the motor from the auxiliary drive mechanism to provide electrical energy from the rotation of the crankshaft. Alternatively, the stator assembly can be attached to the drive clutch shaft (which is in continuous rotation with the crank shaft) to further reduce the width of the entire drive package.

In some embodiments, a centrifugal clutch may be attached to one of the crankshaft and the drive clutch shaft. As such, the centrifugal clutch provides engagement of either the crankshaft or the drive clutch shaft (as the case may be) as revolutions per minute exceed a certain threshold.

A method is provided for making a drive package for an ATV having a front pair and a rear pair of ground engaging members. The method includes, in any particular suitable order, attaching a motor having a crankshaft to the vehicle and coupling an auxiliary drive mechanism (e.g., a belt) to the crankshaft, so that the auxiliary drive mechanism is rotatably drivable by the crankshaft. The method further includes positioning a drive shaft of a CVT rearward of the crankshaft, and coupling the auxiliary drive mechanism to the drive shaft. Accordingly, rotation of the crankshaft causes movement of the auxiliary drive mechanism, thereby causing rotation of the drive shaft to move one or both of the front pair or rear pair ground engaging members.

BRIEF DESCRIPTION OF THE DRAWINGS

Preferred and alternative examples of the present invention are described in detail below with reference to the following drawings.

DETAILED DESCRIPTION

Figure 1:
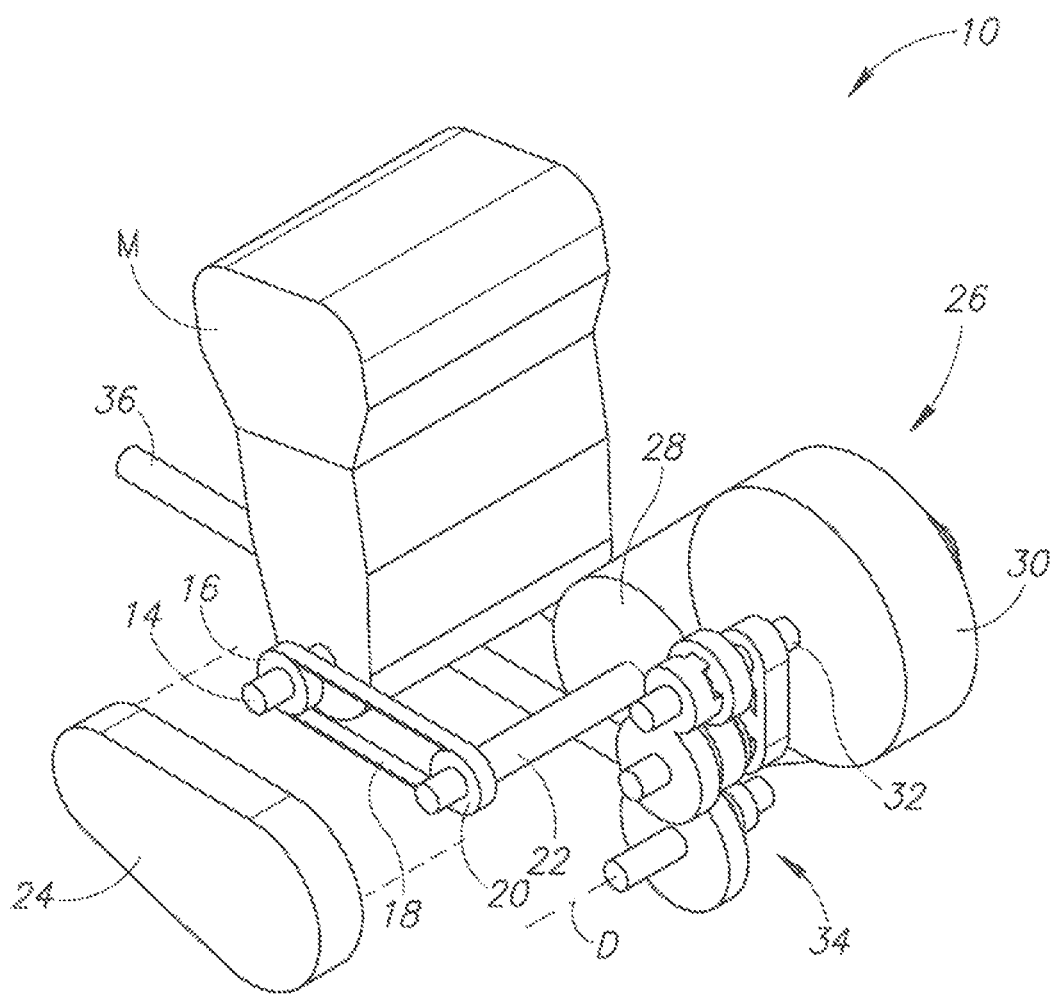
FIG. 1 is an isometric view of a drive package of the present invention.

FIG. 1 shows a drive package 10 for an ATV 12 (FIGS. 2 and 3) in a preferred embodiment. The drive package 10 includes a motor M having a crankshaft 14, in a similar manner to many motors and crankshafts on ATVs. Attached to the crankshaft 14 is a first pulley or gear 16. Rotatably coupled to the first gear 16 is an auxiliary drive mechanism 18, such as a belt or chain, extending from a lateral end of the crankshaft 14. A second pulley or gear 20 is also rotatably coupled to the auxiliary drive mechanism 18. Attached to the second gear 20 is a drive shaft 22, such as a drive clutch shaft. The first gear 16, the second gear 20, and the auxiliary drive mechanism 18 may be covered by a housing 24. As the motor M rotates the crankshaft 14 and the gear 16 rotate in a counter-clockwise direction, for example, as the auxiliary drive mechanism 18 is translated and thereby rotates the gear 20 and drive shaft 22 in the same direction.

Figure 2:
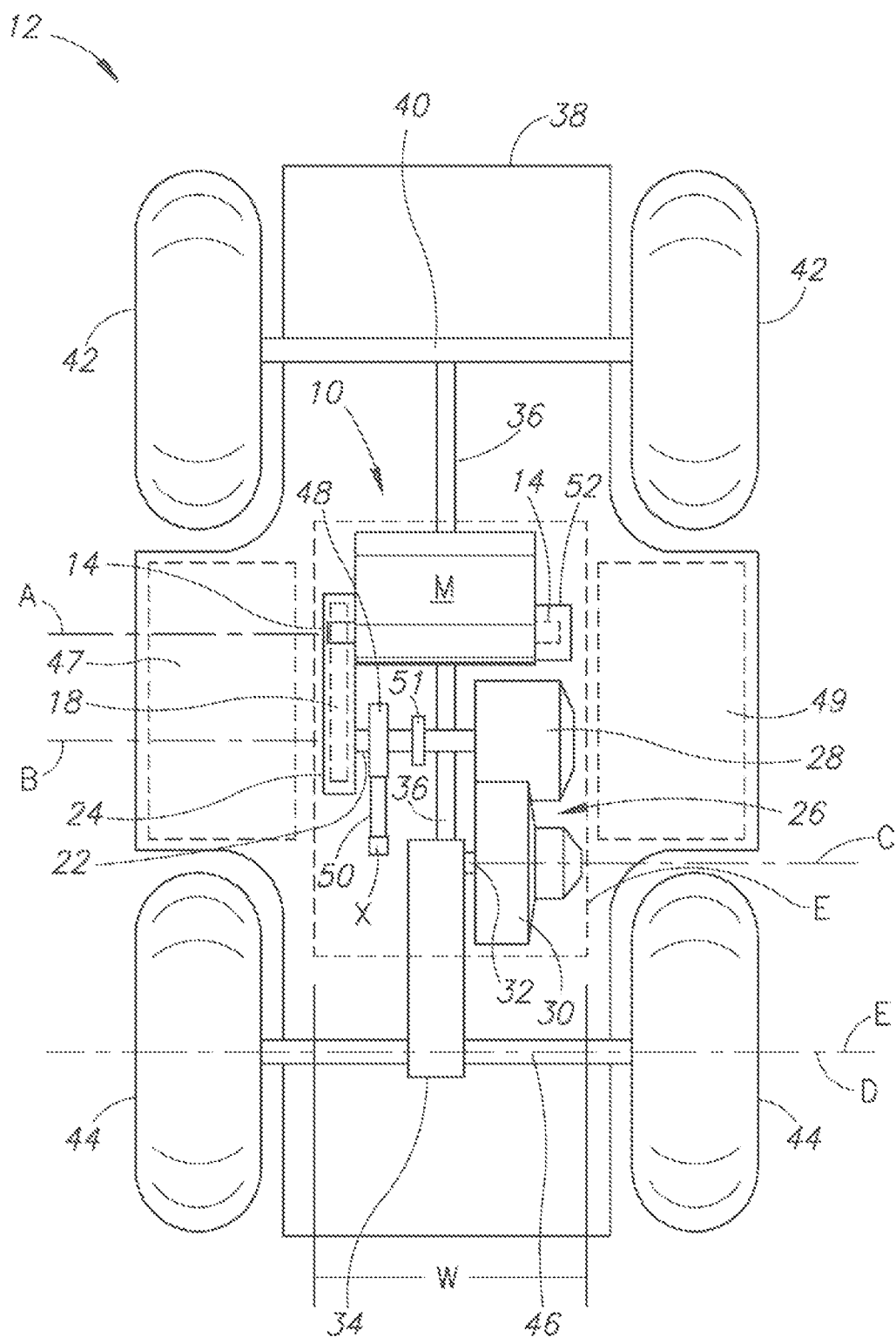
FIG. 2 is a top view of an ATV with the drive package of FIG. 1.
Figure 3:
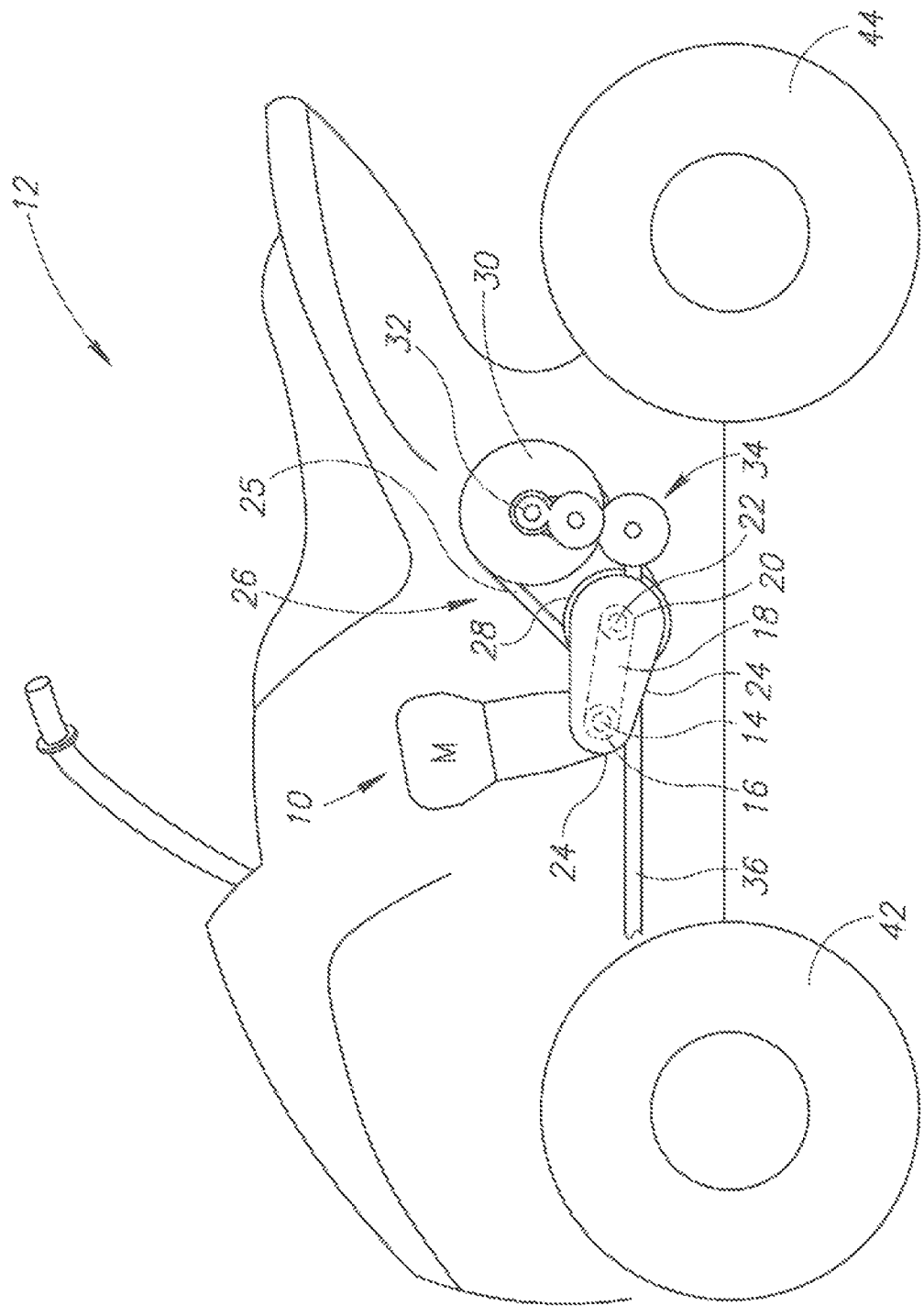
FIG. 3 is a left side view of the ATV of FIG. 2.

The drive shaft 22 is drivingly engaged to a CVT 26. The CVT 26 includes a drive clutch 28 attached to the drive shaft 22. The drive clutch 28 is rotatably coupled to a driven clutch 30 by a CVT belt 25 (FIG. 3). A driven shaft 32 is attached to the driven clutch 30 and coupled to a set of gears 34 (or a gearbox 34; FIG. 2) for transferring rotational energy to a rear axle and to a front drive member 36, which is coupleable to a front pair of wheels (FIG. 2). In operation, as the drive shaft 22 is rotated by the crankshaft 14 via the auxiliary drive mechanism 18, the drive clutch 28 rotates the CVT belt 25 that rotates the driven clutch 30, and consequently rotates the driven shaft 32. The driven shaft 32 may cause rotation of either or both of a front axle or rear axle of a vehicle (e.g., the vehicle of FIG. 2).

Of importance, the CVT 26 is positioned rearward of the motor M and crankshaft 14, in the preferred embodiment. The CVT 26 is coupled to the motor M by the auxiliary drive mechanism 18. Because the auxiliary drive mechanism does not include the relatively wide clutches of a CVT, the drive package width (or envelope width) of the package 10 is reduced as compared to existing packages where the drive clutch is immediately adjacent the left side of the motor. The result is a drive package that has a noticeably reduced width as compared to existing package configurations.

FIG. 2 is a top view of the vehicle 12 having mounted thereto the drive package 10 described with reference to FIG. 1. The vehicle 12 includes a frame 38 (schematically shown), a front axle 40, and a front pair of ground engaging members 42 (e.g., wheels in this example). A rear axle 46 is also coupled to the frame 38 and is coupled to a rear pair of ground engaging members 44. From this view, it will be appreciated that the drive clutch shaft 22 is longitudinally offset from the crankshaft 14. Thus, the crankshaft 14 has a longitudinal axis A that is substantially parallel to, and spatially forward of, a longitudinal axis B of the drive shaft 22. Thus, the crankshaft 14 is oriented transverse to a longitudinal axis of the vehicle. This provides the advantage of providing a predefined envelope E with a predefined width W because the drive clutch 28 is not positioned laterally adjacent the motor M and crankshaft 14, as with existing systems. Here, the drive clutch 28 is rearward the motor M in the preferred embodiment while the crankshaft still exits the side of the engine for transfer of rotational power. Alternatively, the drive clutch 28 and CVT 26 may be positioned forward of the motor M. In some embodiments, depending upon the type of motor used, width W is between 16 inches and 23 inches. In a preferred embodiment, width W is 16 inches or less. One preferred example, with a single cylinder engine, width W is preferably 21.5 inches, or less in some configurations. Using a parallel twin cylinder engine, width W is preferably 23 inches, or less in some configurations.

As discussed with reference to FIG. 1, the driven clutch 30 rotates the driven shaft 32, which is coupled to the gearbox 34. In a preferred embodiment, the gearbox 34 is a transaxle coupled to the rear axle 46 (gearbox 34 is longitudinally exaggerated in FIG. 2 for purposes of illustrating the configuration of the CVT rearward the motor). A half shaft of the rear axle will typically extend from each side of the gearbox 34 to the right and left wheels. As will be appreciated from FIG. 2, each power transfer linkage from the crankshaft 14, to the drive shaft 22, to the driven shaft 32, to the rear axle 46, are each zero degree power transfer linkages relative to each other. Thus, the crankshaft 14, drive shaft 22, driven shaft 32, gears of gearbox 34 (FIG. 1), and rear axle 46 each have an axis of rotation substantially parallel to each other (respectively labeled A, B, C, D, and E). Such configuration is advantageous because it improves the engine efficiency by minimizing energy losses due to zero-degree power transfer linkages from the crankshaft 14 all the way to the axle 46, for example.

A left foot-well 47 and a right foot-well 49 are disposed on either side of the predefined envelope E. Because the predefined width W is 21.5 inches or less, in a preferred embodiment, the foot-wells 47 and 49 are positionable closer together than with existing ATVs. Not only is such spacing ergonomically comfortable, the spare spacing provides room for other vehicle features, including reduced overall width.

In some embodiments, a supplemental gear 48 is attached to the drive shaft 22, and a secondary drive mechanism 50 is rotatably coupled to the supplemental gear 48 on drive shaft 22 for providing power to at least one auxiliary device X attachable to the vehicle 12. The at least one auxiliary device X may be one or more of a water pump, oil pump, compressor, or other device that requires power transfer from the crankshaft of the engine. Advantageously, attaching such devices to the drive clutch shaft (instead of the crankshaft) further reduces the overall width of the drive package. In some embodiments, a centrifugal clutch 51 is coupled to the drive shaft 22 and is actuated at a threshold rotational speed of the drive shaft 22. Of course, an upstream shaft and a downstream shaft (in the drive train sense) would be attached to either side of the centrifugal clutch 51, as with a typical centrifugal clutch configuration. In the configuration shown with the supplemental gear 48 upstream of the centrifugal clutch 51, during relatively low rpms (e.g., when the motor idles) the supplemental gear 48 is rotated but the centrifugal clutch 51 is not yet actuated. In other embodiments (not shown on the figures), the supplemental gear 48 can be positioned downstream the centrifugal clutch 51 such that the supplemental gear 48 is not rotated until the centrifugal clutch 51 engages as rotational speed reaches the threshold.

In some embodiments, a stator 52 is coupled to the crankshaft 14 on an opposing side on the motor M from the auxiliary drive mechanism 18. The stator 52 forms part of an alternator to produce electricity for vehicle functions such as for powering electrical devices of the ATV.

In some embodiments, the gearbox 34 is coupled to the axle 46 (typically two half shafts) and the rear pair of ground engaging members 44 for two-wheel or four-wheel drive operation of the vehicle 12. It will be appreciated that the preferred drive configuration between the driven clutch 30 and the rear pair of ground engaging members 44 is a common transaxle configuration. Alternatively, a separate rear drive case may extend from a transmission to drive the rear wheels.

FIG. 3 shows a left side view of the ATV of FIG. 2. As can be appreciated from this view, the CVT 26 is positioned rearward the motor M. Accordingly, the drive shaft 22 coupled to the drive clutch 28 is positioned rearward and spatially separate from the crankshaft 14.

While the preferred embodiments of the invention have been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. An all-terrain vehicle having a fore-aft axis and a lateral axis perpendicular to the fore-aft axis, the vehicle comprising:
   a front ground engaging member and a rear ground engaging member;
   a motor having a housing enclosing motor components, the housing having a side-to-side lateral extent, the motor having a motor output shaft connected to a laterally extending crankshaft and extending laterally from one side of the housing, the motor output shaft extending external of the housing to the side of the motor, the motor output shaft having an axis of rotation transverse to the fore-aft axis, the motor positioned rearward of the front ground engaging member; and
   a continuously variable transmission ("CVT") having a drive clutch and a driven clutch, the CVT being positioned laterally at least partially directly rearward or forward of the side-to-side lateral extent of the motor housing, the drive clutch being rotatably coupled to the motor output shaft via an auxiliary drive member positioned external to and to the lateral side of the motor housing, the drive clutch positioned rearward or forward of the crankshaft and rearward or forward of the motor, the drive clutch rotatable about an axis transverse to the fore-aft axis, the drive clutch transferring rotational energy from the motor output shaft to the driven clutch, the driven clutch also being rearward or forward of the crankshaft and rearward or forward of the motor.

2. The all-terrain vehicle of claim 1, wherein the auxiliary drive member extending from a lateral end of the motor output shaft and extends fore-aft transverse to the lateral axis of the vehicle to one side of the lateral extent of the motor housing, the driven clutch being positioned to the same lateral side of the auxiliary drive member as the motor housing.

3. The all-terrain vehicle of claim 2, further comprising a secondary drive rotatably coupled to the drive clutch for providing motive power to at least one auxiliary device.

4. The all-terrain vehicle of claim 1, further comprising a transmission coupled to the driven clutch of the CVT.

5. The all-terrain vehicle of claim 4, wherein the auxiliary drive is one of a belt, a chain, and a shaft extending from an end of the motor output shaft at a lateral side of the motor.

6. The all-terrain vehicle of claim 1, further comprising a stator coupled to the motor output shaft and positioned either directly on the motor output shaft or on a drive shaft of the CVT.

7. The all-terrain vehicle of claim 1, further comprising a centrifugal clutch attached to one of the motor output shaft and the drive clutch.

8. The all-terrain vehicle of claim 1, further comprising a gear attached to a drive shaft of the drive clutch, the gear providing power to at least one device upon rotation of the drive shaft, the at least one device being external to and attachable to the vehicle.

9. The all-terrain vehicle of claim 1, wherein the motor and CVT define a predefined drive envelope having a predefined width, wherein the predefined width is between 23 inches and 16 inches.

10. The all-terrain vehicle of claim 1, wherein the motor and CVT define a predefined drive envelope having a predefined width, wherein the predefined width is 21.5 inches or less.

11. An all-terrain vehicle having a longitudinal axis, the vehicle having a pair of front ground engaging members and a pair of rear ground engaging members, the all-terrain vehicle comprising:
    a motor having a crankshaft extending transverse to the longitudinal axis, the crankshaft being housed within a crankcase and having a first lateral end extending from one side of the motor external to the crankcase, the motor having a width envelope extending transverse to the longitudinal axis of the vehicle and defined by a motor housing including the crankcase;
    an auxiliary drive mechanism rotatably coupled to the end of the crankshaft external to and lateral of the crankcase, the auxiliary drive mechanism extending from the crankshaft along a side of the motor to forward or rearward of the motor; and
    a continuously variable transmission ("CVT") having a drive shaft and a driven shaft, the drive shaft being rotatably coupled to the auxiliary drive mechanism, the drive shaft and the driven shaft having axes transverse to the longitudinal axis of the vehicle and offset from a longitudinal axis of the crankshaft, the CVT being positioned forward or rearward of the crankcase and at least partially within the width envelope of the motor; and
    a drivetrain having an input coupled to the driven shaft, the drivetrain being coupled at least one of the ground engaging members.

12. The all-terrain vehicle of claim 11, further comprising a centrifugal clutch rotatably attached to the drive shaft.

13. The all-terrain vehicle of claim 11, wherein a predefined width of the motor housing and auxiliary drive mechanism combined is 21.5 inches or less.

14. The all-terrain vehicle of claim 11, wherein the CVT is positioned rearward of the crankcase.

15. The all-terrain vehicle of claim 11, wherein the CVT is positioned on the same lateral side of the auxiliary drive member as the crankcase.

\* \* \* \* \*